US006366866B1

(12) United States Patent
Kanagawa et al.

(10) Patent No.: US 6,366,866 B1
(45) Date of Patent: Apr. 2, 2002

(54) COORDINATES DETECTING APPARATUS FOR INDEPENDENTLY CORRECTING COORDINATES

(75) Inventors: Makoto Kanagawa, Nagoya; Shinsuke Moriai, Musashino; Takashi Baba, Gifu; Hiroshi Horii, Oogaki, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/237,235

(22) Filed: Jan. 26, 1999

(30) Foreign Application Priority Data

Jan. 27, 1998 (JP) .......................................... 10-014165

(51) Int. Cl.[7] ...................... G01C 17/38; G01C 21/00; G06F 19/00
(52) U.S. Cl. .......................... 702/95; 702/150; 73/1.79; 33/503; 178/18.02
(58) Field of Search .............................. 702/33, 36, 57, 702/85, 94, 95, 107, 124, 126, 150–153, 155, 167, 168, 190, 197; 33/702, 502, 503; 73/1.79, 1.81; 345/178–184; 178/18.01–18.03, 18.05–18.07

(56) References Cited

U.S. PATENT DOCUMENTS

| 3,522,664 A | * | 8/1970 | Lambright et al. ......... 434/324 |
| 4,437,151 A | * | 3/1984 | Hurt et al. ...................... 702/95 |
| 4,723,836 A | * | 2/1988 | Kono et al. .................... 349/12 |
| 4,737,773 A | * | 4/1988 | Kobayashi .................. 345/178 |
| 4,745,565 A | * | 5/1988 | Garwin et al. ................ 702/95 |
| 4,947,156 A | * | 8/1990 | Sato et al. ................... 345/178 |
| 5,212,817 A | * | 5/1993 | Atkinson .................. 455/165.1 |
| 5,255,329 A | * | 10/1993 | Tanimizu et al. ........... 382/112 |
| 5,371,727 A | * | 12/1994 | Shido et al. .............. 369/44.26 |
| 5,471,226 A | * | 11/1995 | Suzuki et al. ................ 345/173 |
| 5,831,600 A | * | 11/1998 | Inoue et al. ................. 345/173 |
| 5,837,947 A | * | 11/1998 | Teterwak ................. 178/18.07 |
| 5,852,260 A | * | 12/1998 | Yoshikawa ............... 178/18.01 |
| 6,016,140 A | * | 1/2000 | Blouin et al. ................ 345/178 |
| 6,041,284 A | * | 3/2000 | Yoshimura et al. ........... 702/56 |

FOREIGN PATENT DOCUMENTS

| JP | 09016332 A | * | 1/1997 | ............. G06F/3/33 |
| JP | 9-62450 | | 3/1997 | |
| JP | 9-101853 | | 4/1997 | |

* cited by examiner

Primary Examiner—Marc S. Hoff
Assistant Examiner—Manuel L. Barbee
(74) Attorney, Agent, or Firm—Armstrong, Westerman & Hattori, LLP.

(57) ABSTRACT

In a coordinates detecting apparatus including a tablet for detecting X and Y coordinates and a correcting circuit for correcting the X and Y coordinates detected from the tablet, a parameter used for correcting the X coordinate and a parameter used for correcting the Y coordinate are adjustable independent from each other. More specifically, time constant of a CR filter circuit for the X coordinate and time constant of the CR filter circuit for the Y coordinate can be adjusted independent from each other. Further, numbers of A/D conversion, threshold values, number of samples and so on for the X and Y coordinates can be set independent from each other. As a result, in the coordinates detecting apparatus, noises in X and Y coordinates can be optimally removed, allowing detection of X and Y coordinates with high accuracy.

24 Claims, 6 Drawing Sheets

COORDINATES DETECTING APPARATUS FOR INDEPENDENTLY CORRECTING COORDINATES

BACKGROUND OF THE INVENTION

1. Field of the Invention

The present invention relates to a coordinates detecting apparatus and, more specifically, to a coordinates detecting apparatus for detecting 2-or 3-dimensional coordinates.

2. Description of the Background Art

A 2-dimensional digitizer for detecting coordinates of a position designated by a pen, a finger or the like has been proposed as a typical coordinates detecting apparatus. In the 2-dimensional digitizer, an X data signal for specifying the X coordinate and a Y data signal for specifying the Y coordinate are generated, the generated data signals are corrected, and the coordinates of the designated position are detected. Here, various methods including resistive film sensing method, electromagnetic induction method, electrostatic coupling method, ultrasonic method, oscillator method and so on may be utilized for the coordinates input sensor. The X and Y data signals may be subjected to correction through hardware or software processing or noise reduction.

Japanese Patent Laying-Open No. 9-62450 or 9-101853 discloses a method of determining irregularity in difference of distance between samples in a tablet as the 2-dimensional digitizer utilizing the resistive film pressure sensing method. According to this method, noises involved in the X and Y data signals can be removed to some extent. The noise, however, cannot be removed completely and always remains either in the X or Y data signal. If the level of noise removal is set higher to completely remove noise, accurate data signal could not be obtained

SUMMARY OF THE INVENTION

The inventors have found through various experiments that the mechanism of noise generation differs between X and Y directions. The above described prior art technique proposes correction or filtering not considering such difference, which is the reason why there is always noise remaining either in the X or Y data signal. The inventors clarified the mechanism of noise generation, and developed a coordinates detecting apparatus capable of almost fully removing noises both in the X and Y directions and capable of detecting accurate coordinates.

Possible causes of difference in noise in the X and Y directions include difference in radiation noise reaching from the liquid crystal display (LCD) below the tablet to the transparent conductive films for specifying X and Y coordinates, difference in length and width of the tablet, difference in sheet resistance of the transparent conductive films for specifying X and Y coordinates, and difference in structure of the transparent conductive films for specifying X and Y coordinates.

An object of the present invention is to provide a coordinate detecting apparatus capable of detecting accurate coordinates almost free of any noise in any of X, Y and Z directions.

According to the present invention, the apparatus for detecting a first coordinate and a second coordinate independent from the first coordinate includes a sensor unit and a correcting unit. The sensor unit is disposed to generate a first data signal for specifying the first coordinate, and a second data signal for specifying the second coordinate. The correcting unit is coupled to receive the first and second data signals and disposed to correct the first data signal using an adjustable first parameter, and to correct the second data signal using a second parameter adjustable independent from the first parameter.

Preferably, the correcting unit includes first and second correcting circuits. The first correcting circuit is coupled to receive the first data signal and disposed to correct the first data signal using the first parameter. The second correcting circuit is coupled to receive the second data signal and disposed to correct the second data signal using the second parameter.

More preferably, the first correcting circuit includes a first filter circuit disposed to remove noise of the first data signal. The second correcting circuit includes a second filter circuit disposed to remove the noise of the second data signal.

Preferably, the correcting unit includes means for setting first and second parameters independently, and means for calculating the first coordinate based on the first data signal using the first parameter, and the second coordinate based on the second data signal using the second parameter.

In the coordinates detecting apparatus structured as described above, the first data signal is corrected by the first parameter, and the second data signal is corrected by the second parameter independently. As the first and second parameters can be adjusted independent from each other, it is possible to optimally correct the first data signal and optimally correct the second data signal. As a result, both the first and second coordinates can be detected at high accuracy.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
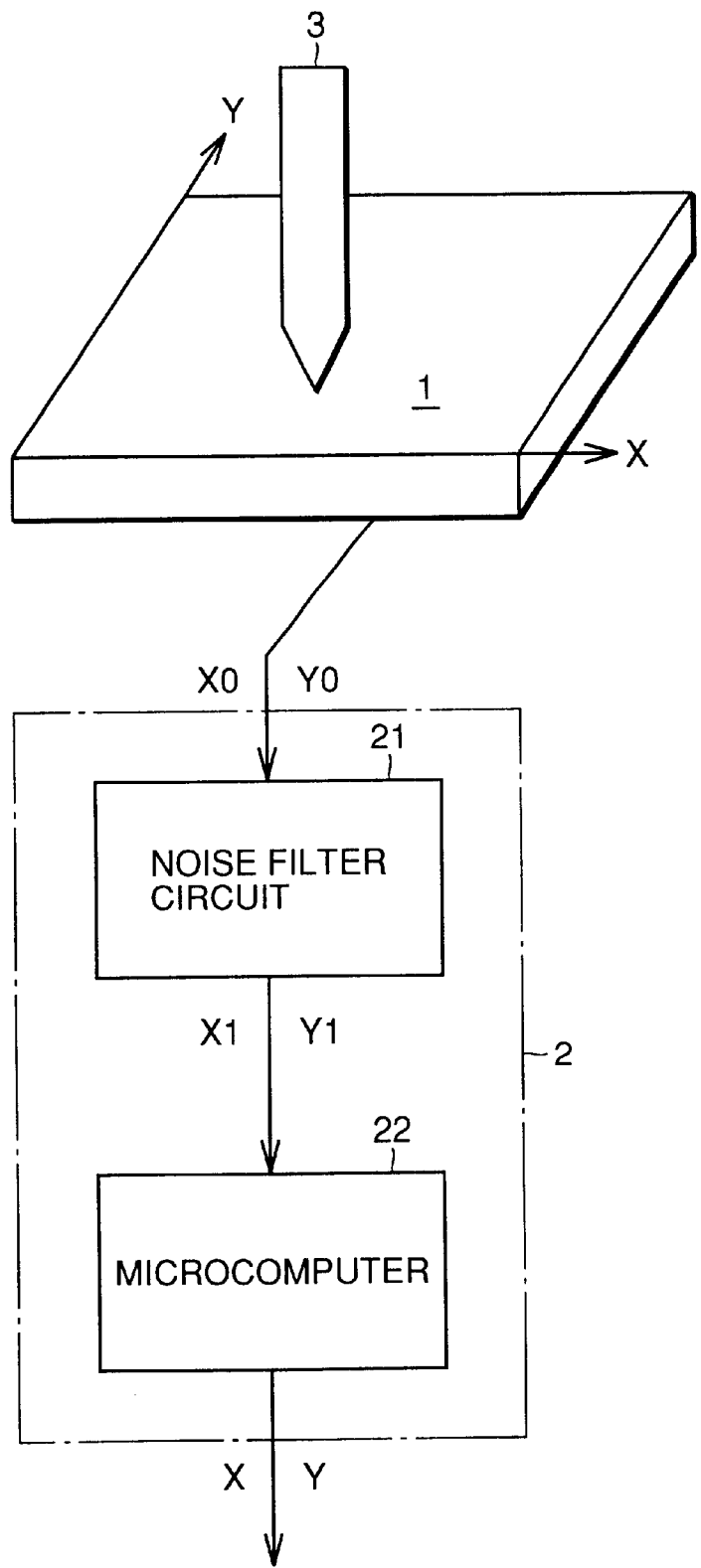
FIG. 1 is a schematic illustration representing an overall configuration of the coordinates detecting apparatus in accordance with an embodiment of the present invention.

An embodiment of the present invention will be described in detail with reference to the figures. Throughout the figures, similar or corresponding portions are denoted by the same reference characters and description thereof is not repeated.

Referring to FIG. 1, the coordinates detecting apparatus in accordance with an embodiment of the present invention includes a 2-dimensional digitizer 1 and a correcting circuit 2, and X and Y coordinates on digitizer 1 pointed by a pen 3 are detected. Digitizer 1 is a sensor unit for generating an X data signal X0 for specifying the X coordinate and a Y data signal Y0 for specifying the Y coordinate. Correcting circuit 2 is coupled to receive X and Y data signals X0 and Y0, corrects X data signal X0 using an X parameter, which will be described later, corrects Y data signal Y0 using a Y parameter, which will be described later, and provides as a resulting output, X and Y coordinates (X, Y). Here, X parameter is adjustable, and Y parameter is also adjustable independent from the X parameter.

Correcting circuit 2 includes a noise filter circuit 21 for removing, by hardware processing, a noise involved in X data signal X and a noise involved in Y data signal Y0, and a microcomputer for correcting, by software processing, X data signal X1 and Y data signal Y1 from noise filter circuit 21.

Figure 2:
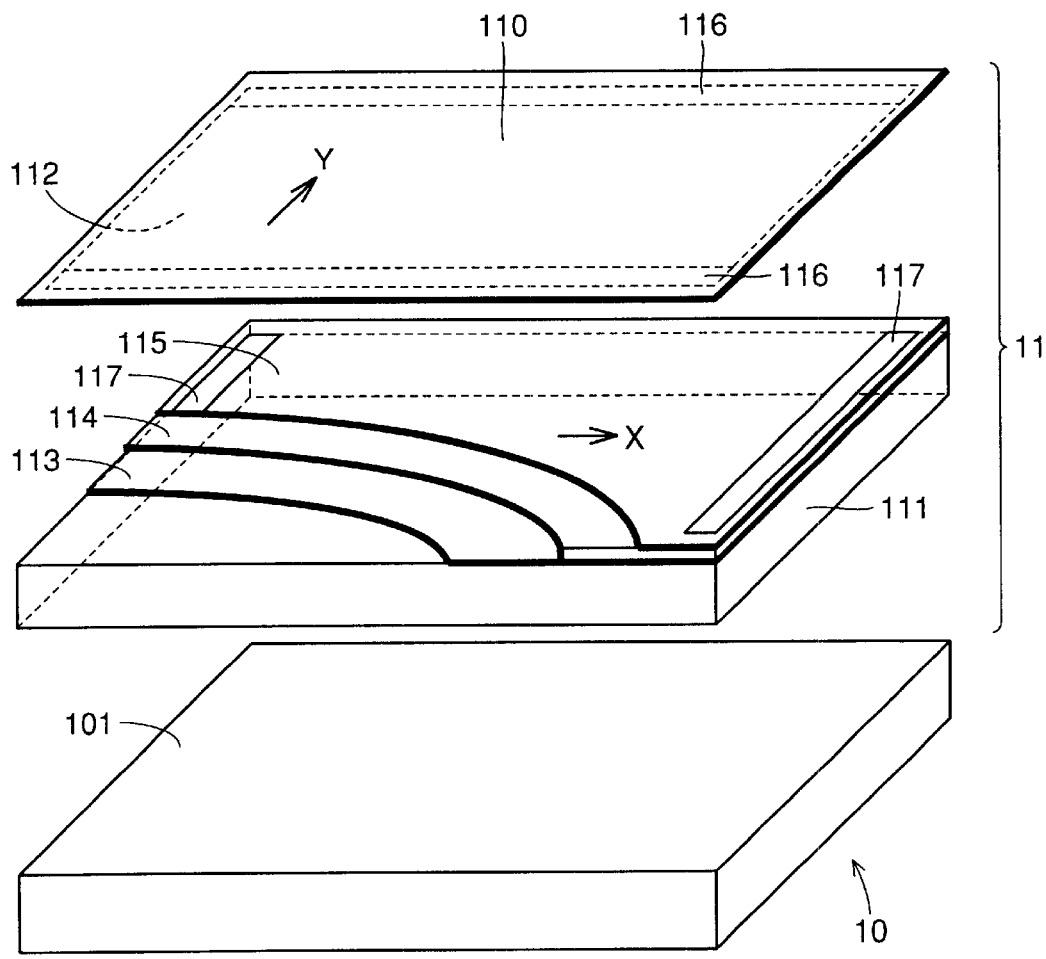
FIG. 2 is an exploded perspective view showing the structure of the 2-dimensional digitizer shown in FIG. 1.

Referring to FIG. 2, 2-dimensional digitizer 1 includes a liquid crystal display (LCD) 10, and a rectangular tablet 11 for input of X and Y coordinates in accordance with the resistive film pressure sensing method. When a character or the like is written by a pen 2 on tablet 11, the character or the like as written is displayed on LCD 10.

Tablet 11 includes a transparent film 110, a transparent glass substrate 111, a transparent conductive film 112 formed on film 110 on the side of glass substrate 111, a transparent conductive film 113 formed on glass substrate 111 on the side of film 110, a transparent insulating film 114 formed on transparent conductive film 113, and a transparent conductive film 115 formed on transparent insulating film 114. Electrodes 116 are formed on opposing sides in the Y direction of transparent conductive film 112. Electrodes 117 are formed on opposing sides in the X direction on transparent conductive film 115. Transparent film 110 is provided facing glass substrate 111 such that transparent conductive film 112 is a little apart from transparent conductive film 115. Therefore, transparent conductive film 112 is generally insulated from transparent conductive film 115 by spacers (not shown). A prescribed voltage is applied between electrodes 116 and 116, and a prescribed voltage is applied between electrodes 117 and 117.

When a desired position on film 110 is pressed by pen 2, transparent conductive film 112 comes to be in contact with transparent conductive film 115 at that position. Accordingly, the voltage divided in the X direction corresponding to the desired position is output as X data signal X0 from transparent conductive film 115. Further, the voltage divided in the Y direction corresponding to the desired position is output as Y data signal Y0 from transparent conductive film 112.

Figure 3:
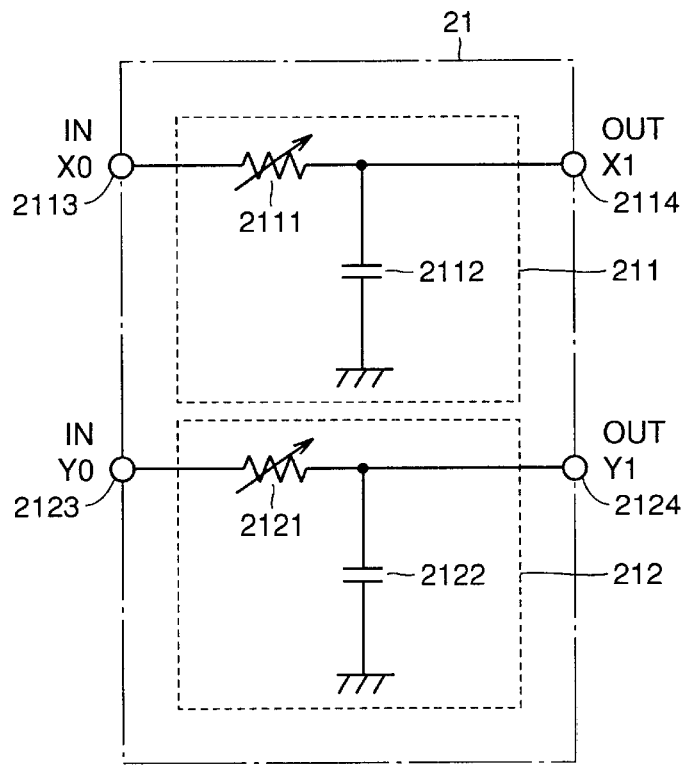
FIG. 3 is a circuit diagram of a noise filter circuit of FIG. 1.

Referring to FIG. 3, noise filter circuit 21 includes a CR filter (lowpass filter; high cut filter) circuit 211 coupled to receive X data signal X0 for removing the noise involved in X data signal X0, and a CR filter (lowpass filter; high cut filter) circuit 212 coupled to receive Y data signal Y0 for removing the noise involved in Y data signal Y0. Filter circuit 211 includes a variable resistor 2111 and a fixed capacitor 2112. Variable resistor 2111 is connected between an input node 2113 and an output node 2114. Capacitor 2112 is connected between output node 2114 and the ground node.

Filter circuit 212 includes a variable resistor 2121 and a fixed capacitor 2122. Variable resistor 2121 is connected between an input node 2123 and an output node 2124. Capacitor 2122 is connected between output node 2124 and the grounds node.

Values of resistors 2111 and 2121 are adjustable independent from each other. Therefore, when much noise is involved in X data signal X0 as compared with Y data signal Y0, the value of variable resistor 2111 is set higher than that of variable resistor 2121. Conversely, when much noise is involved in Y data signal Y0 as compared with the X data signal X0, the value of variable resistor 2121 is set higher than that of variable resistor 2111. The value of capacitor 2112 is so set as to optimally remove the noise of X data signal X0. The value of capacitor 2122 is so set as to optimally remove the noise of Y data signal Y0, independent from capacitor 2112.

Though variable elements are used only for resistors 2111 and 2122, variable elements may be used for capacitors 2112 and 2122 in addition to the resistors 2111 and 2121. Alternatively, fixed elements maybe used for resistors 2111 and 2121, and variable elements may be used only for capacitors 2112 and 2122. In any case, time constant (one type of X parameter) of noise filter circuit 211 and time constant (one type of Y parameter) of noise filter circuit 212 are adjustable independent from each other.

A resistor of which resistance value is set by rotating a volume knob, or a variable resistor with an ROM in which the resistance value is set by a switch or the like in the ROM (Read Only Memory) may be used as variable resistors 2111 and 2121.

Figure 4:
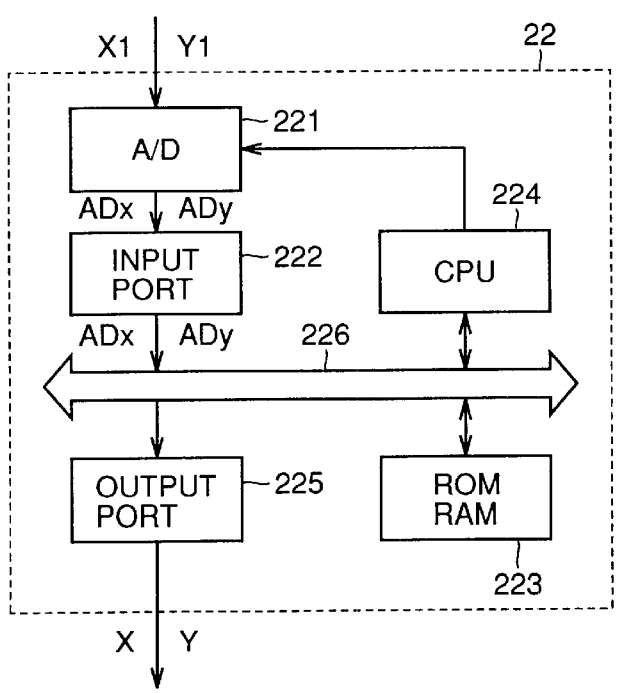
FIG. 4 is a block diagram representing a configuration of the microcomputer of FIG. 1.

Referring to FIG. 4, microcomputer 22 includes an A/D (Analog/Digital) converter 221 for converting analog data signals X1 and Y1 from noise filter circuit 21 to digital data signals ADx and ADy, an input port 222 receiving as inputs digital data signals ADx and ADy, a memory 223 for storing a prescribed program or the like, which will be described later, a CPU (Central Processing Unit) 224 for correcting the data signals ADx and ADy in accordance with the program stored in memory 223 for calculating X and Y coordinates, an output port 225 for outputting the resulting X and Y coordinates, and a data bus 226 for transferring data signals between each of input port 222, memory 223, CPU 224 and output port 225. The program is stored in an ROM (Read Only Memory) in memory 223, and processed data is temporarily stored in an RAM (Random Access Memory) in memory 223.

An operation of the coordinates detecting apparatus structured as above will be described with reference to the flow charts of FIGS. 5 and 6. The program for executing each step of the flow chart is stored in the ROM shown in FIG. 4.

First, in step S1, X and Y parameters are set independent from each other. The X parameter includes Mx, dx, ddx, Dx and Ax. Mx represents the number of A/D conversion of X data signal X0, dx represents a threshold value for a difference of A/D converted values of X data signal X0, ddx represents a threshold value for a difference in the differences between A/D converted values, Dx represents a threshold value for a distance between samples, and Ax represents the number of samples necessary for calculating an average among samples. The Y parameter includes My, dy, ddy, Dy and Ay. My represents the number of A/D conversion of Y data signal Y0, dy represents a threshold value for a difference of A/D converted values, ddy represents a threshold value of a difference of the differences of A/D converted values, dy represents a threshold value for a distance between samples, and Ay represents the number of samples necessary for calculating an average among samples. The method of setting these parameters will be described in detail later.

In step S2, "pen-down" is determined. More specifically, the control waits for the pen-down in step S2 until any position on digitizer 1 is pointed by pen 3. When a desired position on digitizer 1 is pointed by pen 3, X and Y data signals X0 and Y0 are detected.

X data signal X0 is applied to CR filter circuit 211 and noise involved therein is removed. Y data signal Y0 is applied to CR filter circuit 212 and the noise involved therein is removed. X data signal X1 from CR filter circuit 211 and Y data signal Y1 from CR filter circuit 212 are applied to A/D converter 221.

In steps S3 to S8, coordinates of a plurality of samples (Ax samples for X coordinate and Ay samples for Y coordinate) are detected, and average coordinates are determined as final output coordinates. The reason for this is that when coordinates of only one sample are detected, the final coordinates may lead to considerable errors. In step S3, coordinates of one sample are detected. It is possible that values ADx and ADy obtained by one A/D conversion of X data signal X1 and Y data signal Y1, respectively, may be detected as the coordinates of one sample. However, there would be significant errors in the detected coordinates of one sample, and therefore the coordinates of one sample are detected by such a method as represented in FIG. 6.

In step S30, A/D converter 221 samples X data signal X1 Mx times, and performs A/D conversion. Consequently, Mx digital X data signals (A/D converted values) ADx are obtained. Thereafter, A/D converter 221 samples Y data signal Y1 My times, and performs A/D conversion. Consequently, My digital Y data signals (A/D converted values) ADy are obtained.

Thereafter, in step S31, an average ADx1 among Mx A/D converted values ADx is calculated and an average ADy1 among My A/D converted values ADy is calculated.

In step S32, again similar to step S30, Mx A/D converted values ADx and My A/D converted values ADy are obtained.

Thereafter, in step S33, in the similar manner as step S31, an average ADx2 among Mx A/D converted values ADx obtained in step S32 is calculated, and further an average ADy2 among My A/D converted values ADy obtained in step S32 is calculated.

Again, in step S34, in the similar manner as steps S30 and S32, Mx A/D converted values ADx and My A/D converted values ADy are obtained.

Thereafter, in step S35, in the similar manner as steps S31 and S33, an average ADx3 of Mx A/D converted values ADx obtained in step S34 is calculated, and an average ADy3 of My A/D converted values ADy obtained in step S34 is calculated.

As a result of the above described steps S30 to S35, three average A/D converted values ADx1 to ADx3 for the X coordinate and three average A/D converted values ADy1 to ADy3 for the Y coordinate are obtained.

Thereafter, in step S36, differences among continuously obtained average A/D converted values are compared with the threshold value set in step S1. More specifically, the difference |ADx1−ADx2| between the first calculated average A/D converted value ADx1 and the next calculated average A/D converted value ADx2 is compared with the threshold value dx. Further, the difference |ADx2−ADx3| between the average A/D converted value ADx2 and the last calculated average A/D converted value ADx3 is compared with the threshold value dx. Further, the difference |ADy1−ADy2| between the first calculated average A/D converted value ADy1 and the next calculated average A/D converted value ADy2 is compared with the threshold value dy. The difference |ADy2−ADy3| between the average A/D converted value ADy2 and the last calculated average A/D converted value ADy3 is compared with the threshold value dy.

Thereafter, in step S37, if the difference |ADx1−ADx2| or |ADx2−ADx3| is larger than the threshold value dx of if the difference |ADy1−ADy2| or |ADy2−ADy3| is larger than the threshold value dy, it is determined that the average A/D converted values ADx1 to ADx3 or ADy1 to ADy3 obtained through the steps S30 to S35 are not acceptable, and the control returns to step S2. In other words, such average A/D converted values are not used for final calculation of X and Y coordinates.

If differences |ADx1−ADx2| and |ADx2−ADx3| are smaller than the threshold value dx and the differences |ADy1−ADy2| and |ADy2−ADy3| are smaller than the threshold value dy, it is determined that A/D converted values ADx1 to ADx3 and ADy1 to ADy3 obtained through the steps S30 to S35 are free of defects, and the flow proceeds to step S38.

In step S38, difference of the differences among average A/D converted values is determined. More specifically, the difference |ADx1+ADx3−2*ADx2| between the differences |ADx1−ADx2| and ADx2−ADx3| is compared with the threshold value ddx. Further, the difference |ADy1+ADy3−2*ADy2| between the differences |ADy1−ADy2| and |ADy2−ADy3| is compared with the threshold value ddy.

If the difference |ADx1+ADx3−2*ADx2| between the differences is larger than the threshold value ddx or if the difference |ADy1+ADy3−2*ADy2| between the differences is larger than the threshold value ddy, it is determined that the average A/D converted values obtained through the steps S30 to S35 are defective, and the flow returns to step S2. In other words, such average A/D converted values are not used for the final calculation of X and Y coordinates.

If the difference |ADx1 +ADx3−2*ADx2| between the differences is smaller than the threshold value ddx and the difference |ADy1+ADy3−2*ADy2| between the differences is smaller than the threshold value ddy, it is determined that the average A/D converted values obtained through the steps S30 to S35 are not defective, and the flow proceeds to step S40.

In step S40, an average among the three average A/D converted values ADx1, ADx2 and ADx3 obtained through the steps S30 to S35 and determined as not defective in steps S36 to S39 for X coordinate is calculated, and an average among the three average A/D converted values ADy1, ADy2 and ADy3 for the Y coordinate is calculated. These average values are detected as coordinates of one sample.

Figure 5:
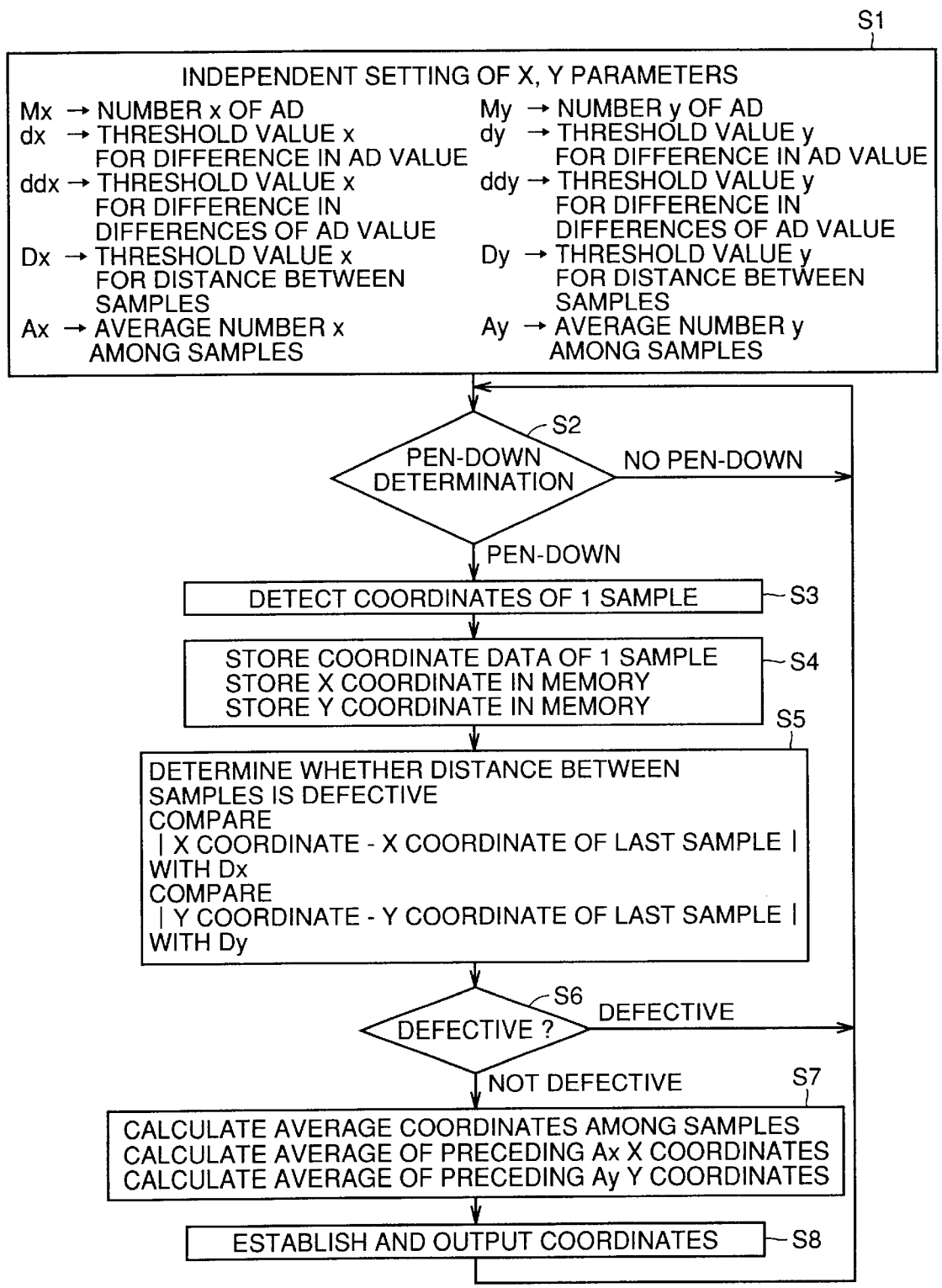
FIG. 5 is a flow chart representing an operation of the microcomputer of FIG. 1.
Figure 6:
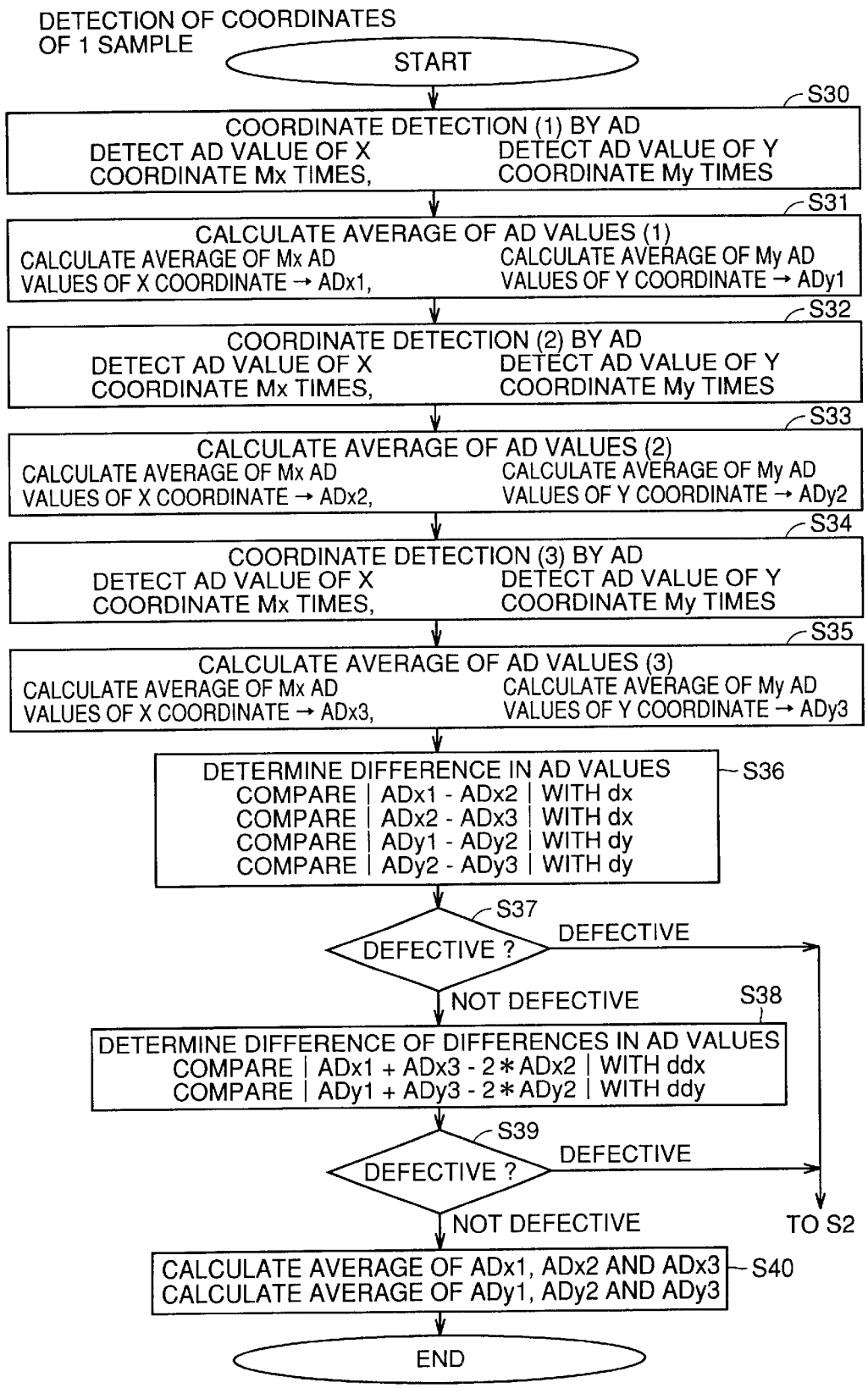
FIG. 6 is a flow chart showing, in detail, the step of detecting one sample of coordinates shown in FIG. 5.

In step S4 shown in FIG. 5, the data of the coordinates detected in step S3 are stored in memory 223. More specifically, the average X coordinate (ADx1+ADx2+ADx3)/3 obtained in step S40 is stored in the RAM, and the average Y coordinate (ADy1+ADy2+ADy3)/3 is stored in the RAM.

Thereafter, in step S5, distance between continuously detected two samples is determined. More specifically, difference between the X coordinate of a sample stored in the RAM and the X coordinate of one preceding sample is compared with the threshold value Dx. Further, difference between the Y coordinate of one sample stored in the RAM and the Y coordinate of one preceding sample is compared with the threshold value Dy.

Thereafter, in step S6, if the difference of the X coordinates is larger than the threshold value Dx or if the difference of Y coordinates is larger than the threshold value Dy, it is determined that the coordinates of one sample obtained in step S3 is defective and the flow returns to step S2. In other words, such coordinates of the sample are not used for final calculation of the X and Y coordinates.

If the difference of the X coordinates is smaller than the threshold value Dx and the difference of the Y coordinates is smaller than the threshold value Dy, it is determined that the coordinates of one sample obtained in step S3 is not defective, and the flow proceeds to step S7.

As a result of the above described operation, it is the case that there are X coordinates of Ax samples and Y coordinates of Ay samples stored in the RAM.

In step S7, an average of the coordinates of the plurality of samples obtained by the repetition of steps S2 to S6 is calculated. More specifically, an average of Ax X coordinates stored in the RAM is calculated, and an average of Ay Y coordinates stored in the RAM is calculated.

Finally, in step S8, the average X coordinate and the average Y coordinate obtained in step S7 are established and output as final X and Y coordinates Thereafter, the process steps S2 to S8 are repeated.

As described above, defectiveness of the A/D converted values is determined in steps S36 to S39, and the average of the A/D converted values is calculated in step S40. Accordingly, subtle fluctuation in detecting coordinates can be compensated for. Further, defectiveness among samples is determined in steps S5 and S6, and an average among samples is calculated in step S7. Therefore, greater fluctuation which cannot be compensated for through steps S36 to S40 can be compensated for. By such two step compensation, highly accurate coordinates data can be obtained.

As described above, in the coordinate detecting apparatus in accordance with the present invention, it is possible to independently set various X parameters necessary for correcting the X data signal X0 detected from digitizer 1 and various Y parameters necessary for correcting the Y data signal Y0 detected from digitizer 1. The specific method of setting the X and Y parameters will be described in the following.

The inventors have newly found that there is a difference among noises involved in the detected X and Y data signals X0 and Y0 in such a digitizer that have the structure shown in FIG. 2, and studied the cause of such difference. The following are the four causes thus found.

(1) Influence of Radiation Noise from LCD10

Figure 7A:
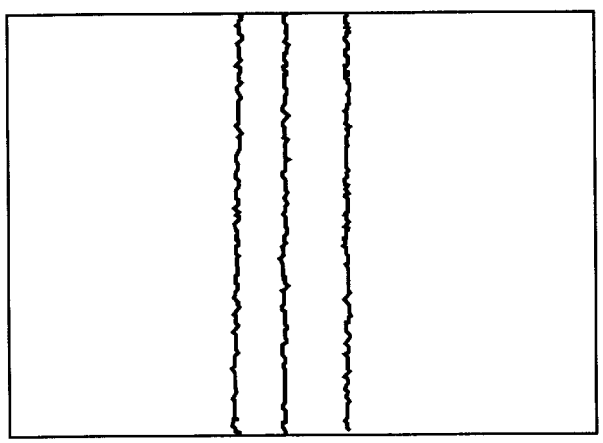
FIG. 7A represents result of coordinates detection when a line is drawn in vertical direction on a conventional 2-dimensional digitizer.

The radiation noise from LCD10 has influence both on transparent conductive films 112 and 115. Here, the influence on transparent conductive film 115 for specifying the X coordinate is larger than the influence on transparent conductive film 112 for specifying the Y coordinate. More specifically, the X data signal X0 to be detected fluctuates more significantly than Y data signal Y0. Accordingly, a detected line when a line is drawn in the horizontal direction (X direction) on tablet 11 hardly fluctuates in the vertical direction (Y direction), whereas a detected line when a line is drawn in the vertical direction much fluctuates in the horizontal direction, as shown in FIG. 7A.

Figure 7B:
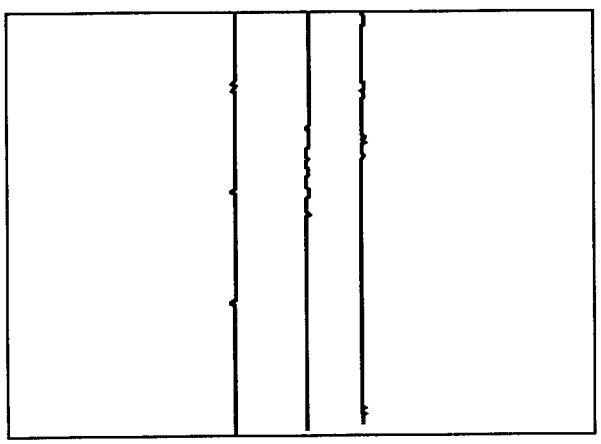
FIG. 7B represents the result of coordinates detection when a line is drawn in the vertical direction on the 2-dimensional digitizer shown in FIG. 1.

In order to suppress fluctuation in the X direction, in step S1 shown in FIG. 5, the number Mx of A/D conversion of X data signal X0 is set larger than the number My of A/D conversion of Y data signal Y0, and the number Ax of samples for the X coordinate is set larger than the number Ay of samples for the Y coordinate. With such settings, the line detected when the line is drawn in the vertical direction hardly fluctuates in the horizontal direction as shown in FIG. 7B.

(2) Influence of Aspect Ratio of Table 11

Referring to FIG. 2, length in the X direction of rectangular tablet 11 is longer than the length in Y direction. Assume that X data signal X0 and Y data signal Y0 detected from 640 mm (length in X direction) ×240 mm (length in Y direction) tablet 11 are to be A/D converted by a 10 bit A/D converter 221. In the X direction, the length per 1 bit is 0.625 mm (=640 mm÷1024), whereas the length are 1 bit in the Y direction is 0.234 mm (=240 mm÷1024). This means that fluctuation in X coordinate is much conspicuous than that in the Y coordinate. In order to suppress such fluctuation, the threshold values dx, ddx and DX for the X coordinate are set larger than the threshold values dy, ddy and Dy for the Y coordinate in step S1 shown in FIG. 5. Given the aspect ratio mentioned above, the threshold values dx, ddx and Dx for the X coordinate are set 2.7 times (=640÷240) the threshold values dy, ddy and Dy for the Y coordinate, respectively.

(3) Influence of Sheet Resistance of Transparent Conductive Films 112 and 115

Generally, transparent conductive film 115 is formed on glass substrate 111, and therefore thickness thereof can be made thinner than transparent conductive film 112 on the side of film 110. Accordingly, sheet resistance of transparent conductive film 115 on the side of glass substrate 111 is higher than the sheet resistance of transparent conductive film 112 on the side of film 110. Noise resistance is approximately proportional to the square of the sheet resistance. Therefore, the noise derived from sheet resistance is smaller in X coordinate than Y coordinate in the structure shown in FIG. 2. As the causes (1) and (2) described above lead to much fluctuation in X coordinate, it is possible to distribute the noise not only in the X direction but also in the Y direction, when the transparent conductive film 115 on the side of glass substrate 111 is used for specifying the X coordinate. Accordingly, when transparent conductive film 115 on the side of glass substrate 111 is used for specifying the Y coordinate, the noise would be concentrated in the X direction. In such a case, the number Mx of A/D conversion or the number Ax of samples of the X coordinate is set larger than the number My of A/D conversion or the number Ay of samples for the Y coordinate in step S1 shown in FIG. 5.

(4) Influence of the Structure of Transparent Conductive Films

Figure 8:
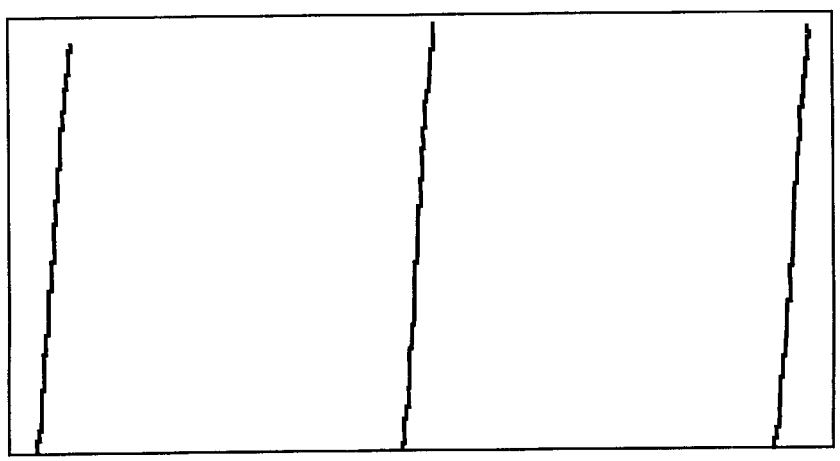
FIG. 8 shows the result of coordinates detection when a line is drawn in the vertical direction on the conventional 2-dimensional digitizer in which a conductive film on the side of a glass substrate has 2-layered structure.

Referring to FIG. 2, on the side of glass substrate 111, there is a transparent conductive film 115 and further, there is a transparent conductive film 113 formed therebelow. By contrast, on the side of film 110, there is not such a transparent conductive film formed below transparent conductive film 112. As transparent conductive films 113 and 115 oppose to each other with a transparent insulating film 114 interposed, this provide a capacitor. When the transparent conductive films 113 and 115 form a 2-layered structure on the side on glass substrate 111, even when a line is drawn exactly in the vertical direction (Y direction) on tablet 11, the detected line fluctuates in the horizontal direction (X direction) and is oblique as shown in FIG. 8. In order to suppress such fluctuation in the X direction, threshold values dx, ddx and Dx for the X coordinate are set larger than the threshold values dy, ddy and Dy for the Y coordinate in the step S1 shown in FIG. 5.

As described above, according to the present embodiment, variable resistor 2111 is provided in CR filter circuit 211 for the X coordinate, and a variable resistor 2121 adjustable independent from variable resistor 2111 is provided in the CR filter circuit 212 for the Y coordinate, and noises involved in the X and Y data signals X0 and Y0 can be removed optimally. Further, as parameters Mx, dx, ddx, Dx and Ax for correcting the X coordinate and parameters My, dy, ddy, Dy and Ay for correcting the Y coordinate can be set independent from each other by software, X and Y coordinates can be corrected optimally. As a result, accuracy in coordinate detection is improved.

Though a 2-dimensional coordinate detecting apparatus has been described, the present invention is also applicable to a 3-dimensional coordinate detecting apparatus. More specifically, a correcting circuit similar to those described above may be provided in the 3-dimensional coordinates detecting apparatus for detecting the Z coordinate independent from and in addition to the X and Y coordinates.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for detecting a first coordinate and a second coordinate independent from said first coordinate, comprising:
    a sensor unit disposed to generate a first data signal for specifying said first coordinate and a second data signal for specifying said second coordinate; and
    a correcting unit coupled to receive said first and second data signals, disposed to correct said first data signal using an adjustable first parameter, and correcting said second data signal using a second parameter adjustable independent from said first parameter, wherein
        said first parameter includes a first number of A/D conversion of said first data signal, and said second parameter includes a second number of A/D conversion of said second data signal; and
        said correcting unit includes
            means for setting said first and second numbers of A/D conversion independently,
            means for A/D converting said first data signal by said set first number of A/D conversion, and for A/D converting said second data signal by said set second number of A/D conversion, and
            means for calculating an average value of said A/D converted first data and calculating an average value of said A/D converted second data, said calculated average values of said A/D converted first data and said A/D converted second data constitute a sample for said first data signal and said second data signal, respectively, wherein
                said first parameter includes a first number of samples for calculating an average among samples of said first data signal, and said second parameter includes a second number of samples for calculating an average among samples of said second data signal; and
                said correcting unit further includes
                    means for setting said first and second numbers of samples independently, and
                    means for calculating an average of said set first number of samples of the first data signal, and for calculating an average of said set second number of samples of said second data signal.

2. The apparatus according to claim 1, wherein said correcting unit includes
    a first correcting circuit coupled to receive said first data signal and disposed to correct said first data signal using said first parameter, and
    a second correcting circuit coupled to receive said second data signal and disposed to correct said second data signal using said second parameter.

3. The apparatus according to claim 2, wherein
    said first correcting circuit includes a first filter circuit disposed to remove noise of said first data signal, and
    said second correcting circuit includes a second filter circuit disposed to remove noise of said second data signal.

4. The apparatus according to claim 3, wherein
    said first filter circuit includes
        a first resistor connected between an input node and an output node thereof, and
        a first capacitor connected between the output node and a ground node,
        said first resistor and or said first capacitor being a variable element; and
    said second filter circuit includes
        a second resistor connected between an input node and an output node thereof, and
        a second capacitor connected between the output node and a ground node,
        said second resistor and/or said second capacitor being a variable element.

5. The apparatus according to claim 1, wherein said correcting unit includes
    a memory disposed to store a prescribed program, and
    a processor coupled to said memory and disposed to correct said first and second data signals in accordance with said program.

6. The apparatus according to claim 1, wherein said correcting unit includes
    means for setting said first and second parameters independently; and
    means for calculating said first coordinate based on said first data signal using said first parameter, and calculating said second coordinate based on said second data signal using said second parameter.

7. The apparatus according to claim 1, wherein
    the first parameter further includes a first threshold value for a difference of A/D converted values of said first data signal, and said second parameter includes a second threshold value for a difference of A/D converted values of said second data signal;
    wherein said means for calculating an average value calculates a plurality of average values for a plurality of first data signals and a plurality of average values for a plurality of second data signals; and
    said correcting unit further includes
        means for setting said first and second threshold values independently, and
        means for calculating a plurality of differences between successive calculated average values of said first data signals and a plurality of differences between successive calculated average values of said second data signals;
        means for comparing said difference of successive average values of said first data signals with said set first threshold value, and for comparing said difference between successive average values of said second data signals with said set second threshold value.

8. The apparatus according to claim 7, wherein
said first parameter further includes a third threshold value for a difference in differences of A/D converted values of said first data signal, and said second parameter further includes a fourth threshold value for a difference in differences of A/D converted values of said second data signal; and
said correcting unit further includes
means for setting said third and fourth threshold values independently, and
means for comparing a difference between successive calculated differences of the average values of said first data signals with said set third threshold value, and for comparing a difference between successive calculated differences of average values of said second data signals with said set forth threshold value.

9. The apparatus according to claim 8, wherein
said sensor unit includes
a liquid crystal display, and
a rectangular tablet attached on said liquid crystal display for an input of said first and second coordinates; and
said third and fourth threshold values are set in accordance with aspect ratio of said tablet.

10. The apparatus according to claim 8, wherein
said sensor unit includes
a liquid crystal display, and
a tablet attached on said liquid crystal display for an input of said first and second coordinates,
a tablet including
a transparent substrate,
a transparent film opposing to and spaced apart from said transparent substrate,
a first transparent conductive film formed on said transparent substrate on the side of said transparent film,
a transparent insulating film formed on said first transparent conductive film,
a second transparent conductive film formed on said transparent insulating film for specifying said first coordinate, and
a third transparent conductive film formed on said transparent film on the side of said transparent substrate for specifying said second coordinate; and
said third threshold value is set larger than said fourth threshold value.

11. The apparatus according to claim 7, wherein
said sensor unit includes
a liquid crystal display, and
a rectangular tablet attached on said liquid crystal display for an input of said first and second coordinates; and
said first and second threshold values are set in accordance with aspect ratio of said tablet.

12. The apparatus according to claim 7, wherein
said sensor unit includes
a liquid crystal display, and
a tablet attached on said liquid crystal display for an input of said first and second coordinates,
said tablet including
a transparent substrate,
a transparent film opposing to and spaced apart from said transparent substrate,
a first transparent conductive film formed on said transparent substrate on the side of said transparent film,
a transparent insulating film formed on said first transparent conductive film,
a second transparent conductive film formed on said transparent insulating film for specifying said first coordinate, and
a third transparent conductive film formed on said transparent film on the side of said transparent substrate, for specifying said second coordinate; and
said first threshold value is set larger than said second threshold value.

13. The apparatus according to claim 1, wherein
said first parameter further includes a first threshold value for a difference among samples of said first data signal, and said second parameter further includes a second threshold value for a difference among samples of said second data signals; and
said correcting further includes
means for setting said first and second threshold values independently, and
means for comparing a difference between a sample of the average value of said first data signal with another sample preceding by one with said set first threshold value, and for comparing a difference between a sample of the average of said second data signal with another sample preceding by one with said set second threshold value.

14. The apparatus according to claim 13, wherein
said sensor unit includes
a liquid crystal display, and
a rectangular tablet attached on said liquid crystal display for an input of said first and second coordinates; and
said first and second threshold values are set in accordance with aspect ratio of said tablet.

15. The apparatus according to claim 13, wherein
said sensor unit includes
a liquid crystal display, and
a tablet attached on said liquid crystal display for an input of said first and second coordinates,
said tablet including
a transparent substrate,
a transparent film opposing to and spaced apart from said transparent substrate,
a first transparent conductive film formed on said transparent substrate on the side of said transparent film,
a transparent insulating film formed on said first transparent conductive film,
a second transparent conductive film formed on said transparent insulating film for specifying said first coordinate, and
a third transparent conductive film formed on said transparent film on the side of said transparent substrate for specifying said second coordinate; and
said first threshold value is set larger than said second threshold value.

16. The apparatus according to claim 1, wherein
said sensor unit includes
a liquid crystal display, and
a tablet attached on said liquid crystal display for an input of said first and second coordinates; and
said first number of A/D converter is set in accordance with variation of said first data signal, and said second number of A/D converter is set in accordance with variation of said second data signal.

17. The apparatus according to claim 1, wherein
said sensor unit includes
   a liquid crystal display, and
   a tablet attached on said liquid crystal display for an input of said first and second coordinates; and
   said first number of samples is set in accordance with variation of said first data signal, and said second number of samples is set in accordance with variation of said second data signal.

18. The apparatus according to claim 1, wherein
said sensor unit includes
   a liquid crystal display, and
   a tablet attached on said liquid crystal display for an input of said first and second coordinates,
said tablet including
   a transparent substrate,
   a transparent film opposing to and spaced apart from said transparent substrate,
   a first transparent conductive film formed on said transparent substrate on the side of said transparent film, for specifying said first coordinate, and
   a second transparent conductive film formed on said transparent film on the side of said transparent substrate, for specifying said second coordinate; and
said first number of conversion is set in accordance with sheet resistance of said first transparent conductive film, and
said second number of conversion is set in accordance with sheet resistance of said second transparent conductive film.

19. The apparatus according to claim 1, wherein
said sensor unit includes
   a liquid crystal display, and
   a tablet attached on said liquid crystal display for an input of said first and second coordinates,
said table including
   a transparent substrate,
   a transparent film opposing to and spaced apart from said transparent substrate,
   a first transparent conductive film formed on said transparent substrate on the side of said transparent film, for specifying said first coordinate, and
   a second transparent conductive film formed on said transparent film on the side of said transparent substrate, for specifying said second coordinate; and
said first number conversion is set in accordance with sheet resistance of said first transparent conductive film, and said second number of samples is set in accordance with sheet resistance of said second transparent conductive film.

20. A method of detecting a first coordinate and a second coordinate independent from said first coordinate, comprising the steps of:
   generating a first data signal for specifying and first coordinate, and a second data signal for specifying said second coordinate;
   correcting said first data signal by using an adjustable first parameter;
   correcting said second data signal by using a second parameter adjustable independent form said first parameter;
   said first parameter includes a first number of A/D conversion of said first data signal, and said second parameter includes a second number of A/D conversion of said second data signal; and said step of correcting includes the steps of
   setting said first number of A/D conversion,
   setting said second number of A/D conversion independent from said first number of A/D conversion,
   A/D converting said first data signal by said set first number of A/D conversion,
   A/D converting said second data signal by said set second number of A/D conversion,
   calculating an average value of said A/D converted first data signal, and
   calculating an average value of said A/D converted second data signal, said calculated average values of said A/D converted first data and said A/D converted second data constitute a sample for said first data signal and said second data signal, respectively,
said first parameter further includes a first number of samples for calculating an average among samples of said first data signal, and said second parameter further includes a second number of samples for calculating an average among samples of said second data signal; and
said step of correcting further includes the steps of;
   setting said first number of samples,
   setting said second number of samples independent from said first number of samples,
   calculating an average of said set first number of samples of the first data signal, and
   calculating an average of said set second number of samples of the second data signal.

21. The method according to claim 20, wherein
said step of correcting includes the steps of
   setting said first parameter,
   setting said second parameter independent from said first parameter,
   calculating said first coordinate based on said first data signal by using said first parameter, and
   calculating said second coordinate based on said second data signal by using said second parameter.

22. The method according to claim 20, wherein
said first parameter further includes a first threshold value for a difference among A/D converted values of said first data signal, and said second parameter further includes a second threshold value for a difference among A/D converted values of said second data signal wherein said step for calculating an average value of said A/D converted first data signal calculates a plurality of average values for a plurality of first data signals and said step of calculating an average value of said A/D converted second data signal calculates a plurality of average values for a plurality of second data signals: and
said step of correcting further includes the steps of
   setting said first threshold value,
   setting said second threshold value independent from said first threshold value,
   calculating a plurality of differences between successive calculated average values of said first data signals and a plurality of differences between successive calculated average values of said second data signals,
   comparing said difference of successive average values of said first data signals with said set first threshold value, and
   comparing said difference of successive average value of said second data signals with said set second threshold value.

23. The method according to claim 22, wherein said first parameter further includes a third threshold value for a difference among difference of A/D converted values of said first data signal, and said second parameter further includes a fourth threshold value for a difference among differences of the A/D converted values of said second data signal; and said step of correcting further includes the steps of
setting said third threshold value,
setting said fourth threshold value independent from said third threshold value,
comparing a difference between successive calculated differences of the average values of said first data signals with said set third threshold value, and
comparing a difference between successive calculated differences of the average values of said second data signals with said set threshold value.

24. The method according to claim 20, wherein said first parameter further includes a first threshold value for a difference among samples of said first data signal, and said second parameter includes a second threshold value for a difference among samples of said second data signals; and said method of correcting further includes the steps of
setting said first threshold value,
setting said second threshold value independent from said first threshold value,
comparing a difference between a sample of the average value of said first data signal and another sample preceding by one with said set first threshold value, and
comparing a difference between a sample of the average value of said second data signal and another sample preceding by one with said set second threshold value.

* * * * *